July 26, 1949.  H. SHELTON  2,477,468
ACTUATING MECHANISM APPLICABLE TO VEHICLE BRAKES
Filed Feb. 28, 1947  2 Sheets-Sheet 1

Inventor
Harold Shelton
By
Munn, Liddy & Glaccum
Attorneys

July 26, 1949.  H. SHELTON  2,477,468
ACTUATING MECHANISM APPLICABLE TO VEHICLE BRAKES
Filed Feb. 28, 1947  2 Sheets-Sheet 2
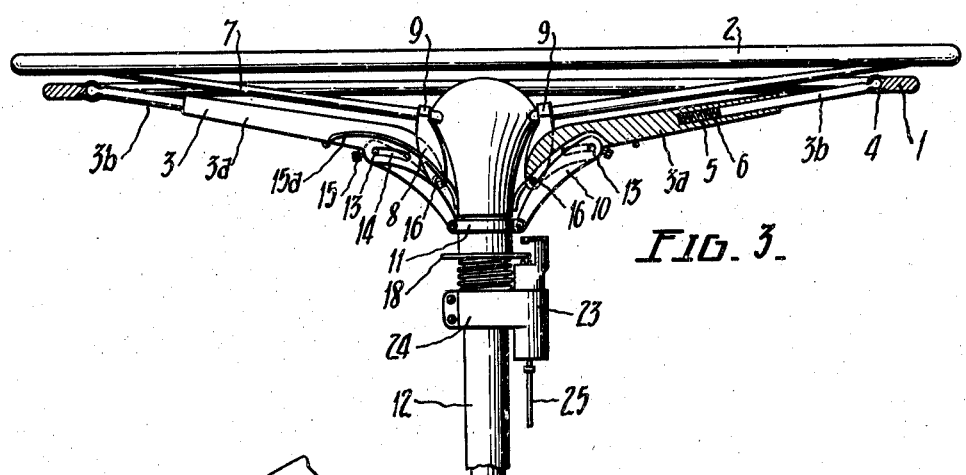
FIG. 3.
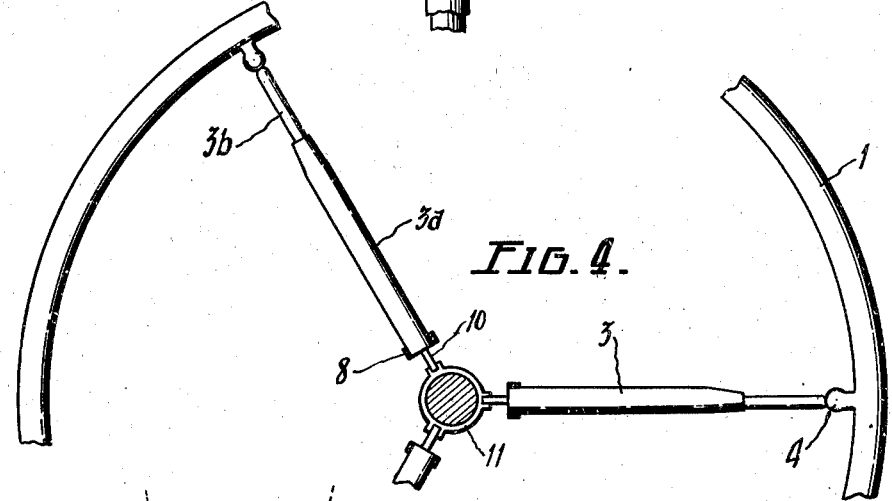
FIG. 4.
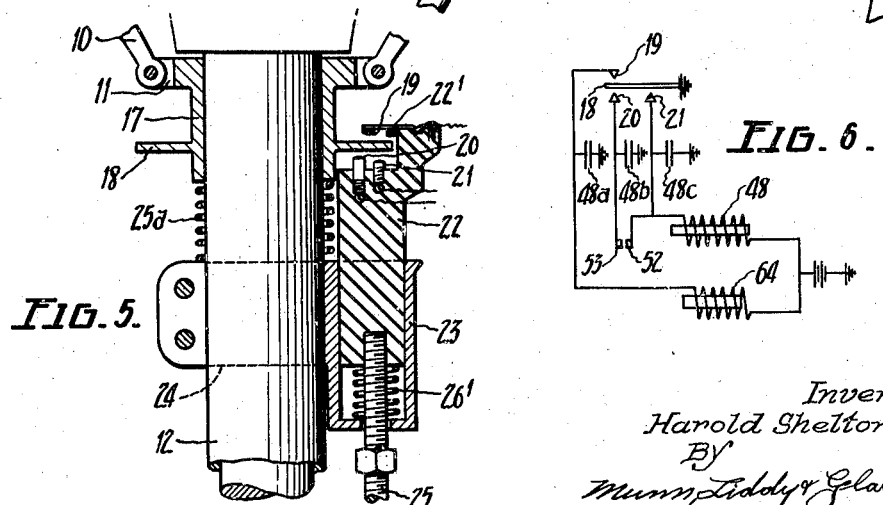
FIG. 5.
FIG. 6.
Inventor
Harold Shelton
By
Munn, Liddy & Glaccum
Attorneys Patented July 26, 1949

2,477,468

UNITED STATES PATENT OFFICE 2,477,468

ACTUATING MECHANISM APPLICABLE TO VEHICLE BRAKES

Harold Shelton, Elwood, Victoria, Australia

Application February 28, 1947, Serial No. 731,536
In Australia March 18, 1946

7 Claims. (Cl. 188—152)

My invention relates to improvements in actuating mechanism for vehicle brakes of the type which is dependent for its operation on changes of pressure in a cylinder; and the objects of my improvement are, first, to provide a manually operable brake-actuating mechanism of the above type which is extremely sensitive in its operation; and, second, to provide means whereby the braking of the vehicle can be effected by relatively slight movements of a control ring or the like located adjacent to the steering wheel of the vehicle.

I attain these objects by mechanism illustrated in the accompanying drawings, in which—

Figure 3 is a part-sectional view in side elevation of the manually operable member mounted adjacent to the steering wheel, Figure 4 is a broken plan view showing the construction of the manually operable member.

Figure 5 is an enlarged view in sectional side elevation of portion of the mechanism shown in Figure 1, Figure 6 is a diagrammatic representation of the electrical circuit embodied in the actuating mechanism.

Figure 1:
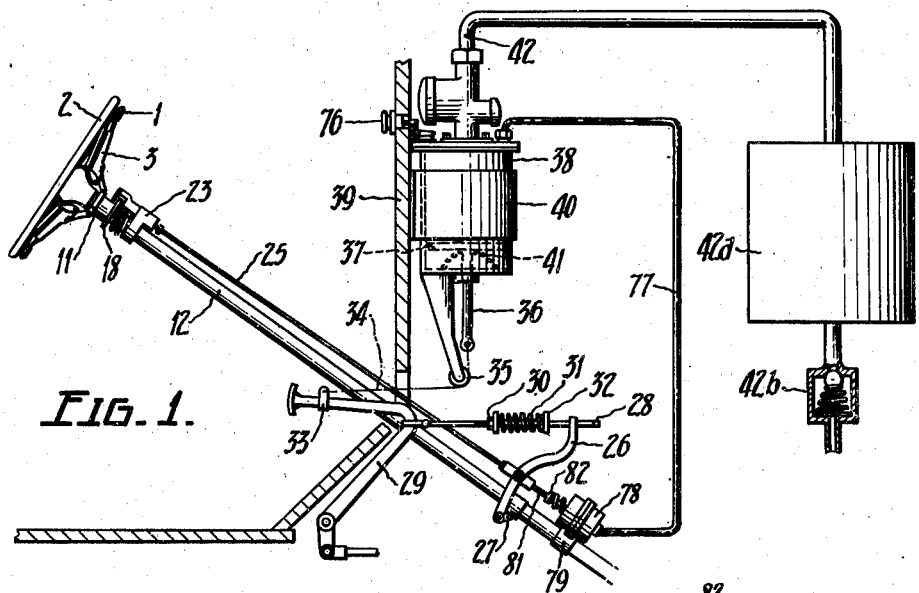
Figure 1 is a diagrammatic view in side elevation of the actuating mechanism.

A manually operable member 1 in the form of a ring is mounted adjacent to and a short distance beneath the steering wheel 2 of the vehicle, the said ring 1 being capable of upward or downward movement to operate the brake actuating mechanism. The ring 1 is provided with telescopic spokes 3 having inner portions 3a and outer portions 3b, the outer portions being connected to the ring 1 by means of ball joints 4. The inner ends of the outer portions 3b of the spokes are disposed within recesses 5 in the outer ends of the inner portions 3a and are pressed outwardly by springs 6 located in the recesses. The inner end of each inner portion 3a of the telescopic spokes 3 is pivoted on a pin 16 carried transversely on a bracket 8 which is attached by a cap 9 at its upper end to a spoke of the steering wheel 2. The brackets 8 each comprise two side members which extend downwardly from the caps 9 on both sides of the inner portions 3a of the telescopic spokes 3, the pins 16 being supported transversely by the side members and forming the pivots for the telescopic spokes 3. A centrally disposed longitudinally extending channel is formed on the lower side of each inner portion 3a of the telescopic spokes 3 and in these channels slide the upper ends of links 10 pivoted at their lower ends to an annular member 11 which is slidably mounted on the steering column casing 12. The links 10 are retained in the channels by pins 13 secured to the links and which slide in slots 14 formed in the inner portions 3a on both sides of each channel. An adjusting screw 15 is provided in the end of each slot 14. Tension springs 15a tending to keep the telescopic spokes 3 in a raised position are also mounted on pins 16. A sleeve 17 depending from and formed integrally with the annular member 11, is provided near its lower end with an annular grounded metal contact 18 which is adapted to engage contacts 19, 20, 21 in an insulated mounting 22, which is slidable in a housing 23 attached to the steering column casing 12 by a collar 24. A stop 22¹ is formed integrally with or secured to the mounting 22 and is disposed slightly above the lower face of the contact 19. A spring 25a mounted on the steering column casing 12 tends to urge the sleeve 17 upwardly. The contact 20 is spring loaded and is slightly higher than the adjacent contact 21. A link rod 25 passing through the base of the housing 23, is screwed into the base of the slidable mounting 22 and a spring 26' is provided between the base of the mounting and the base of the housing. The link rod 25 is connected at its lower end to a curved arm 26 which is pivotally mounted on a bearing 27 secured on the steering column casing 12. The upper end of the arm 26 is provided with a hole through which passes the end portion of a rod 28, the other end of which is pivotally linked to the foot pedal rod 29. The rod 28 is threaded on its central portion and is provided with a nut 30 and spring 31, the spring being provided with a cap 32 which is adapted to engage the arm 26 when the mechanism is operating.

A bracket clip 33 is provided near the upper end of the foot pedal lever and is attached to one end of a chain or cable 34 which passes round a pulley 35 and is connected to the lower end of a piston rod 36 which is secured to the lower side of piston 37. The piston 37 forms a snug fit in cylinder 38 which is secured to a portion of the body 39 by bracket 40. A compression spring 41 is mounted on the piston rod 36 between the base of the cylinder 38 and the piston 37. The upper end of the cylinder 38 is provided with intake and offtake valves mounted thereon. The offtake valve is connected by a pipe 42 to the manifold of the engine through a reservoir or tank 42a a non-return valve 42b being provided in the pipe between the reservoir and the engine. The intake valve leads to atmosphere.

Figures 2, 7:
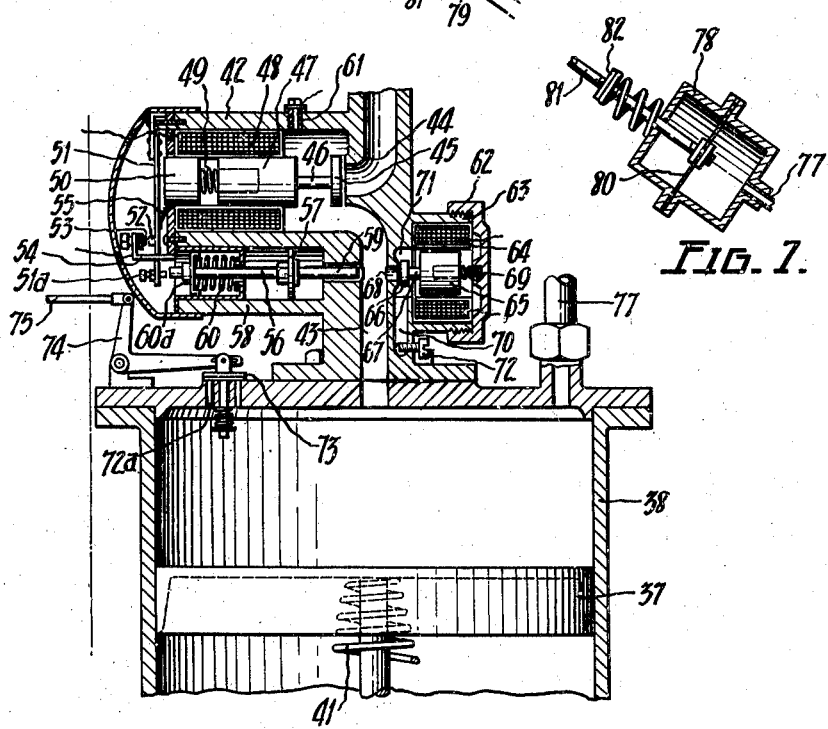
Figure 2 is an enlarged sectional side elevation of portion of the mechanism shown in Figure 1.
Figure 7 is an enlarged sectional view of part of the mechanism shown in Fig. 1.

The offtake valve designated generally by reference numeral 42 (Figure 2) comprises a passage-way 43 connected to the upper end of the cylinder 38 and having a port 44 normally closed by valve 45. The valve is carried by rod 46 secured to spring-loaded armature 47 which is disposed partly within solenoid 48. One end of spring 49 is disposed within a recess in the armature 47 and the other end engages a pole piece 50 which is energised by solenoid 48. A contact arm 51, the upper end of which is in electrical connection with the solenoid 48, is provided near its lower end with a contact point 52 which is adapted to engage an adjacent contact point 53 mounted on a bracket 54. A spring member 55 presses the contact arm 51 to the left and thus normally maintains the points 52, 53 closed. The upper end of the contact arm 51 is in electrical connection with the contact 21 in the insulated mounting 22 and the bracket 54 is in electrical connection with the spring-loaded contact 29. Terminal 61 which is in electrical connection with the solenoid 48, is also connected to a battery (see Figure 6). A grounded condenser 48b is provided in the circuit between the points 52, 53 and contact 20 and a grounded condenser 48c in the circuit between the contact arm 51 and contact 21. The lower end of the contact arm 51 is provided with an adjustable screw 51a which engages the end of a spring-loaded piston rod 56. The piston 57 which slides within cylinder 58 is secured on one side to piston rod 56, and a valve 59 which is adapted to close the passageway 43 is secured to the other side of the piston 57. A spring 60 normally forces the piston rod 56 towards the left, thus maintaining the points 52, 53 closed and the passageway 43 open. The pressure of the spring 60 can be adjusted by means of a screw 60a on the rod 56.

The intake valve designated generally by the reference 62 comprises a housing 63 within which is mounted a solenoid 64 and a co-acting spring loaded armature 65 to which is secured a valve 66 by means of rod 67. The valve 66 is adapted to normally close port 68 by reason of the pressure of spring 69. An air-inlet passage 70 opens into recess 71 and is provided with a metering screw 72. One lead from the solenoid 64 is connected to the contact 19 and the other lead is connected to the battery. A grounded condenser 48a is provided in the circuit between the solenoid 64 and the contact 19.

An air inlet 72a is provided in the upper wall of the cylinder 38 and is provided with a spring-loaded valve 73 which is adapted to be manually raised by means of a bell crank 74 connected to a rod 75. The latter is fitted with a knob 76 or the like which when pulled outwardly, raises the valve 73. The rod 75 may alternatively be connected to the throttle lever linkage.

The interior of the cylinder 38 is connected by means of a tube 77 with a cylinder 78 (Figure 1) which is secured on the steering column casing 12 by bracket 79. A diaphragm 80 is disposed in the cylinder 78 and is connected to a spring-loaded rod 81 which is pivoted on the curved arm 26. The pressure of the spring may be adjusted by means of a nut 82 threaded on the rod 81.

The operation of the brake-actuating mechanism is as follows:

To apply the brakes, the control ring 1 is slightly depressed against the pressure of the spring 25a. When the ring 1 is depressed, the telescopic spokes 3 are pivoted downwardly on the pins 16. This downward pivoting movement is transmitted through the pins 13 to the links 10 which are thus depressed. The downward movement of the links 10 lowers the annular member 11, the sleeve 17 and the annular contact 18 until the latter touches the upwardly extending contact 20 in the insulated mounting 22. This energises the solenoid 48 in the offtake valve 42 of the vacuum cylinder 38 and causes the armature 47 and valve 45 to move towards the left, thus opening the port 44. Suction is then applied to the interior of cylinder 38 which causes the piston 37 to move upwardly therein, thus actuating the foot brake through chain 34. The movement of the foot pedal lever 29 displaces the rod 28 to the right and the cap 32 engages the curved arm 26 and displaces the upper end thereof towards the right. This movement causes the link rod 25 to move downwardly and the insulated mounting is accordingly lowered, thus breaking the contact between the annular contact 18 and the contact 20. The solenoid 48 is de-energised and the valve 45 moves to the right, thus closing the port 44. The piston 37 and brake mechanism are accordingly held stationary and the brakes will only be applied more firmly if the ring 1 is further depressed. For each slight further depression of the ring, this series of operations is repeated in succession.

As will be seen from Figure 1, there is a certain amount of lost motion before the curved arm 26 is displaced by the cap 32 and this amount can be decreased by screwing nut 30 towards the right and increased by screwing the nut in the opposite direction.

When the solenoid 48 is energised, and the port 44 opened as hereinbefore described, the pole piece 50 is also energised and attracts the contact arm 51 against the pressure of spring 55, thus breaking the points 52, 53. The solenoid is accordingly de-energised and the spring 49 displaces the armature 47 and valve 45 to the right, thus tending to close the port 44. On breaking of the points, the pole piece 50 is de-energised and this allows the contacts 52, 53 to close again by pressure of spring 55. Thus a series of rapid oscillations of the valve 45 is set up while the ring 1 is being depressed and these oscillations produce a smoothness in the braking effect. The valve 59 is displaced to the right when suction is applied and tends to close the passageway 43 and reduce the suction. This brings about an increase in the frequency in the opening and closing of the port 44 and produces a further increase in smoothness and sensitivity of the mechanism. When the valve 59 is in its normal position, the piston rod 56 acts against the screw 51a attached to the lower end of the contact arm 51, and maintains the points 52, 53 closed. When the pressure in the cylinder 38 is reduced, the valve 59 moves to the right and allows the contact arm 51 to oscillate as hereinbefore described. This ensures that oscillation does not commence until a predetermined reduction in pressure has been effected.

When the desired braking power has been reached, downward pressure on the ring 1 is discontinued and the ring is held stationary. On this occurring, the break between the annular contact 18 and the contact 20 is at once made effective and the resultant break in the electrical circuit causes the offtake port to remain closed and the piston to be held stationary in the cylinder. This maintains the braking pressure constant.

When it is desired to release the brakes, the ring is released and allowed to return to its original position. This raises the annular contact 18, causing it to contact the upper contact 19 and thereby close the circuit with the solenoid 64 controlling the port of the intake valve 62 of the vacuum cylinder 38. When the solenoid 64 is energised the armature 65 and valve 66 are displaced to the right thus opening the port 68 and allowing air to enter the cylinder through the passage 70. This allows the piston 37 to return to its original position, thereby releasing the brakes.

When the port 44 is opened and suction applied to the cylinder 38, suction is also produced in the cylinder 78 thus causing the central portion of the diaphragm 80 to be displaced to the right. This causes the rod 81 and the link rod 25 to move accordingly and tends to pull the contact 20 away from the annular contact 18. As the diaphragm 80 is very sensitive to changes in pressure, the reaction is very rapid and so the oscillating movements set up are of high frequency. This further ensures great smoothness and sensitivity in the operation of the brakes.

In case of failure of the main circuit which includes the spring-loaded contact 20, the emergency circuit which includes the contact 21 will operate the brakes when the ring 1 is depressed so that the annular contact 18 engages the contact 21. The latter is connected directly to the solenoid 48 and the latter will be energised when the contacts 18, 21 are engaged. The mechanism in this case functions as previously described except that the points 52, 53 do not form part of the circuit.

In case of failure of the intake valve 62 the brakes may be released by opening the valve 73 by means of knob 76 on the dash board. If the valve 73 is connected with the throttle lever linkage, the brakes are released automatically when the throttle is opened.

The provision of a reserve tank or reservoir between the engine and the vacuum cylinder allows the brakes to be applied in an emergency after the engine has ceased running, for example in the event of stalling. The number of times the brakes can be applied by this means depends on the capacity of the reservoir.

The location of the ring 1 allows it to be conveniently operated by means of the thumb or thumbs while the hands are on the steering wheel in the normal position. If one side only of the ring is depressed, the telescopic construction of the spokes allows the side which is depressed to be lowered to a greater extent than the other side, thus avoiding a tendency to jamming of the ring.

The contacts 18, 19, 20, 21 function efficiently over long periods without cleaning, as the annular contact 18 is rotated with the steering wheel and if the brakes are applied as the steering wheel is being turned, the contacts are automatically cleaned by the relative movement between them.

In the description and claims, the phrases referring to applying or releasing the brakes is intended to include, where applicable, the meaning "increases or decreases the degree of application of the brakes."

I claim:

1. In a vehicle, brake-actuating mechanism comprising a source of suction, a brake pedal, a cylinder connected with the source of suction, a piston in the cylinder in operative connection with the brake pedal of the vehicle, oppositely disposed rigidly-connected members mechanically connected to the brake pedal, manually operable means, a control member mechanically connected to the manually operable means, the control member being adapted to be moved into engagement with one of the first-mentioned members by movement in one direction of the manually operable means in order to apply the brakes, and the control member being adapted to be moved into engagement with the other of the first-mentioned members by movement in the other direction of the manually operable means in order to release the brakes, the movement of the brake pedal in either direction causing the first-mentioned members to be moved in the same direction as that in which the control member was moved, thus tending to re-establish the previous relative positions of the said members.

2. In a vehicle, brake-actuating mechanism comprising a source of suction, a brake pedal, a cylinder connected with the source of suction, a piston in the cylinder in operative connection with the brake pedal of the vehicle, the brakes being adapted to be applied when suction is applied to said cylinder, intake and offtake valves for said cylinder, a pair of oppositely disposed electrical contacts, a single mounting for said contacts mechanically connected to the brake pedal, a manually operable ring member adjacent the steering wheel of the vehicle, an electrical contact mechanically connected to said ring, means electrically operable to open said offtake valve, a circuit including said electrically operable means and one of the first-mentioned contacts, means electrically operable to open said intake valve, a circuit including the second-mentioned electrically operable means and the other of the first-mentioned contacts, the second-mentioned contact being adapted to be moved into engagement with one of the first-mentioned contacts by movement of the said ring, thereby closing the circuit containing the offtake valve and causing the offtake valve to be opened and suction to be applied to said cylinder, the movement of the brake pedal causing the first-mentioned contacts to be moved in the same direction as that in which the second-mentioned contact was moved in order to open the offtake valve, thus tending to re-establish the previous relative positions of the said contacts, the second-mentioned contact also being adapted to be moved into engagement with the other of the first-mentioned contacts by movement of the said ring, thereby closing the circuit containing the intake valve and causing the intake valve to be opened and the brakes to be released.

3. In a vehicle, brake-actuating mechanism according to claim 2, a plurality of contacts on said mounting means adjacent to each other, each contact being electrically connected to the means electrically operable to open the offtake valve.

4. In a vehicle, brake-actuating mechanism according to claim 2, telescopic spokes and link mechanism which is capable of movement relative to the spokes connecting said ring to said second-mentioned contact.

5. In a vehicle, brake-actuating mechanism according to claim 2, a normally closed manually operable air-inlet valve in said cylinder.

6. In a vehicle, brake-actuating mechanism comprising a source of suction, a brake pedal, a cylinder connected with the source of suction, a piston in the cylinder in operative connection with the brake pedal of the vehicle, the brakes being adapted to be applied when suction is applied to said cylinder, intake and offtake valves for said cylinder, oppositely disposed rigidly-connected members mechanically connected to the brake pedal, manually operable means, a control member mechanically connected to the manually operable means, the control member being adapted to be moved into engagement with one of the first-mentioned members by movement in one direction of the manually operable means in order to open the said offtake valve and apply the brakes, and the control member being adapted to be moved into engagement with the other of the first-mentioned members by movement in the other direction of the manually operable means in order to open the said intake valve and release the brakes, the movement of the brake pedal in either direction causing the first-mentioned members to be moved in the same direction as that in which the control member was moved, thus tending to re-establish the previous relative positions of the said members.

7. In a vehicle, brake-actuating mechanism comprising a source of suction, a brake pedal, a cylinder connected with the source of suction, a piston in the cylinder in operative connection with the brake pedal of the vehicle, the brakes being adapted to be applied when suction is applied to said cylinder, intake and offtake valves for said cylinder, oppositely disposed rigidly-connected electrical contacts mechanically connected to the brake pedal, manually operable means, an electrical contact mechanically connected to the manually operable means, the second mentioned electrical contact being adapted to be moved into engagement with one of the first-mentioned electrical contacts by movement in one direction of the manually operable means in order to open the said offtake valve and apply the brakes, and the second-mentioned electrical contact being adapted to be moved into engagement with the other of the first-mentioned electrical contacts by movement in the other direction of the manually operable means in order to open the said intake valve and release the brakes, the movement of the brake pedal in either direction causing the first-mentioned electrical contacts to be moved in the same direction as that in which the second-mentioned electrical contact was moved, thus tending to re-establish the previous relative positions of the said electrical contacts.

HAROLD SHELTON.

REFERENCES CITED

The following references are of record in the file of this patent:

UNITED STATES PATENTS

| Number | Name | Date |
|---|---|---|
| 1,857,053 | Kratz | May 3, 1932 |
| 1,878,822 | Dewandre | Sept. 20, 1932 |